July 3, 1951 E. N. SHAWHAN 2,559,173

SELECTIVE CIRCUITS

Filed Aug. 26, 1948 6 Sheets-Sheet 1

INVENTOR.
ELBERT N. SHAWHAN
BY Bussauer Hardig
ATTORNEYS

SELECTIVE CIRCUITS

INVENTOR.
ELBERT N. SHAWHAN
BY
Busser & Harding
ATTORNEYS

July 3, 1951 E. N. SHAWHAN 2,559,173

SELECTIVE CIRCUITS

Filed Aug. 26, 1948 6 Sheets-Sheet 3

INVENTOR.
ELBERT N. SHAWHAN
BY
Bussey & Harding
ATTORNEYS

July 3, 1951 E. N. SHAWHAN 2,559,173

SELECTIVE CIRCUITS

Filed Aug. 26, 1948 6 Sheets-Sheet 4

INVENTOR.
ELBERT N. SHAWHAN
BY
Busser + Harding
ATTORNEYS

July 3, 1951 E. N. SHAWHAN 2,559,173

SELECTIVE CIRCUITS

Filed Aug. 26, 1948 6 Sheets-Sheet 5

INVENTOR.
ELBERT N. SHAWHAN
BY
Busser & Harding
ATTORNEYS

INVENTOR.
ELBERT N. SHAWHAN
BY
Busser & Harding
ATTORNEYS

Patented July 3, 1951 2,559,173

UNITED STATES PATENT OFFICE 2,559,173

SELECTIVE CIRCUITS

Elbert N. Shawhan, Morton, Pa., assignor to Sun Oil Company, Philadelphia, Pa., a corporation of New Jersey Application August 26, 1948, Serial No. 46,225

3 Claims. (Cl. 250—27)

This invention relates to selective circuits and particularly to circuits having characteristics which render them highly selective to frequency and/or phase of signals. The circuits here involved are of a synchronous rectifying type particularly capable of discriminating between desired signals and high level noise or interfering signals of frequency quite close to the frequency of the desired signals.

This application is in part a continuation of my application Serial Number 6,287, filed February 4, 1948.

In many cases the use of filters is quite inadequate to secure discrimination between desired signals and other signals or noise accompanying them. An example of this appears in the application referred to above involving the use of multiplier phototubes utilized in the measurement of very weak illumination, such as occurs in the measurement of the weak light intensities produced in Raman spectrometers. Random electron emission from the photosensitive surface occur which will mask the weak photoelectric currents which are to be measured. This random emission is commonly known as noise and its nature can best be appreciated by considering the result which this noise gives on a cathode ray oscillograph: an illuminated area, rather aptly referred to as "grass," which might be considered as composed of signals of completely random amplitudes and frequency of recurrence. Adhering to this oscillograph picture, the photoelectric currents which may have to be measured may theoretically appear as linear curves in this "grass" and are normally substantially indetectable unless their amplitudes rise well into or above the maximum amplitudes of the noise.

The foregoing is merely an illustration of many similar problems which require discrimination of weak signals from other signals of large amplitude and of quite closely related frequencies. Such problems arise, for example, in connection with mass spectrometers, magnetometers, radio communication, etc. Filters are quite generally useless in attempting to solve these problems since even the best construction of a filter of many sections will provide pass bands of widths amounting to a range of frequencies bearing to the signal frequencies a quite substantial ratio. In particular, at lower audio frequencies substantial discriminating by filters is impossible of attainment.

In accordance with the present invention there are provided circuits which will afford extremely critical frequency selection, discriminating, for example, between frequencies which differ by only a fraction of a cycle per second even when the frequencies are quite high. In accordance with the invention there is provided a synchronous rectifying system of non-mechanical type designed for a high degree of frequency discrimination and for operation at frequencies of great range. It is known that synchronous rectification carried out mechanically by the use of commutating systems may give good frequency or phase discrimination, but mechanical rectifying systems have various limitations due to varying contact potentials and inability to operate at speeds corresponding to high frequencies. In accordance with the present invention, various systems, basically equivalent to each other, may be provided, these systems involving diode rectifiers which, while preferably of thermionic type, may be of the crystal type using, for example, germanium rectifiers. The improved rectifying systems utilize inputs respectively of the signal to be measured and of a synchronizing potential of the same frequency and of corresponding phase. Their outputs integrated over a suitable interval represent a measure of signal value discriminated, even at high frequencies, from signals of very large amplitude differing from the desired ones by only a few cycles, or even a fraction of a cycle at lower frequencies, per second. Discrimination is also afforded from signals of the same frequency but of phase relationships differing from those of the desired signal. In particular, discrimination is secured against high level noise to the end that there may be attained an effective reduction of noise relative to the desired signals in a ratio of better than 1,000 to 1.

While the signals to be discriminated against may generally be unavoidable it is sometimes desirable to introduce through a particular channel of a circuit along with a desired signal another signal having a frequency quite close to that of the desired frequency, for example, for the purpose of automatic volume control by the use of the latter signal which, by reason of the close approach of its frequency to that of the desired signal, involves its being subject to substantially the same modifications through the channel as the desired signal. An example of this is also given in the application referred to above.

In accordance with the invention it is also possible to have a channel carrying two or more independent signals of identical frequencies but different phase and provide discrimination between the several signals so as to effect substantially complete segregation of one from the other.

The general object of the invention relates to the attainment of the various objectives discussed above. These objects, as well as further objects of the invention, may be best made apparent by the following specific descriptions of typical systems in conjunction with the accompanying drawings in which.

Figures 1, 2:
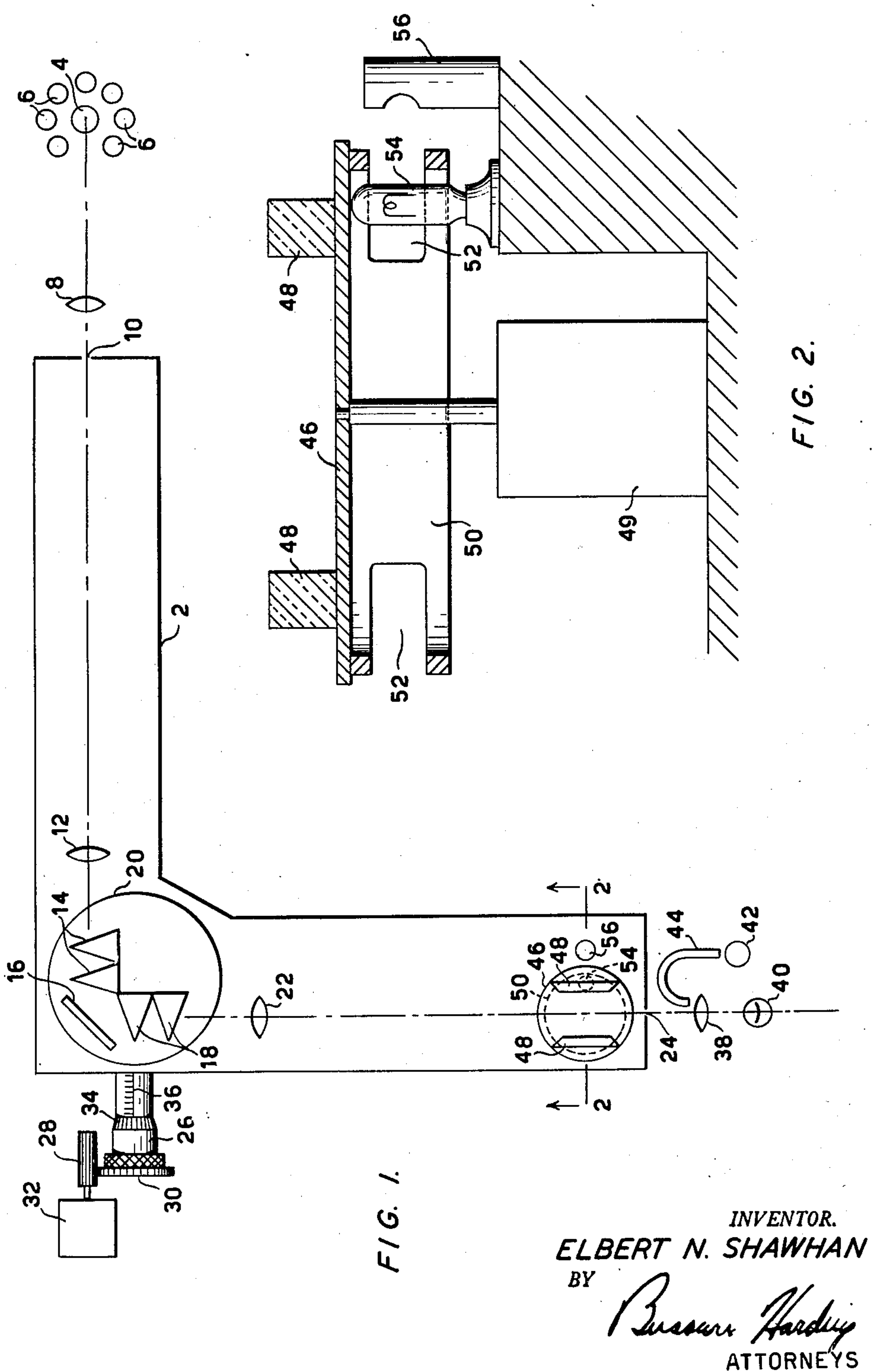
Figure 1 is a diagram illustrating the association of various physical elements of a Raman spectrograph involving the use of the invention.
Figure 2 is a vertical section taken on the plane indicated at 2—2 in Figure 1 and illustrating in particular the construction of a light chopping means combined with means for alternately passing a narrow band of a spectrum and for scanning a limited region of the spectrum on both sides of said narrow band.
Figure 3A:
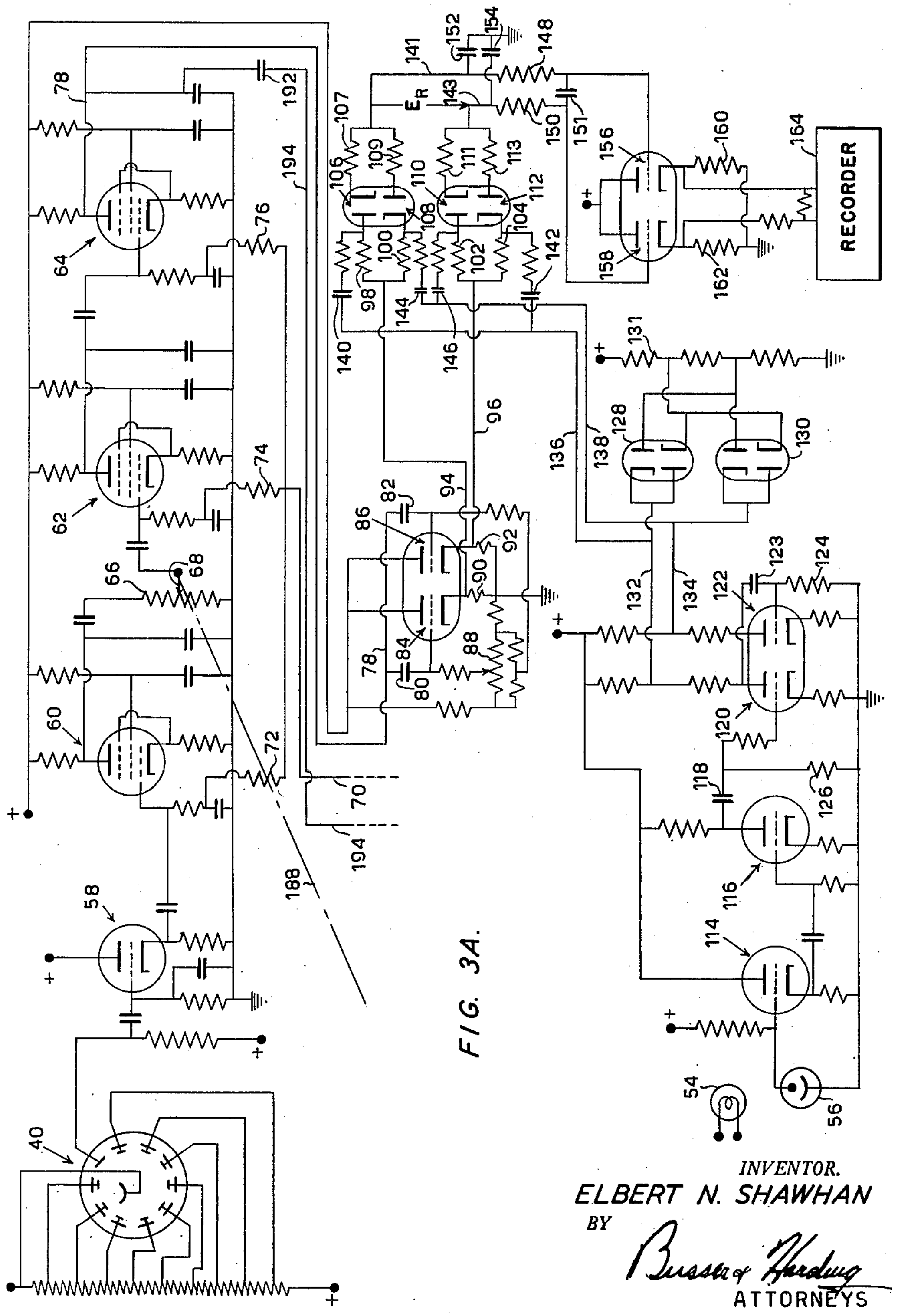
Figure 3B:
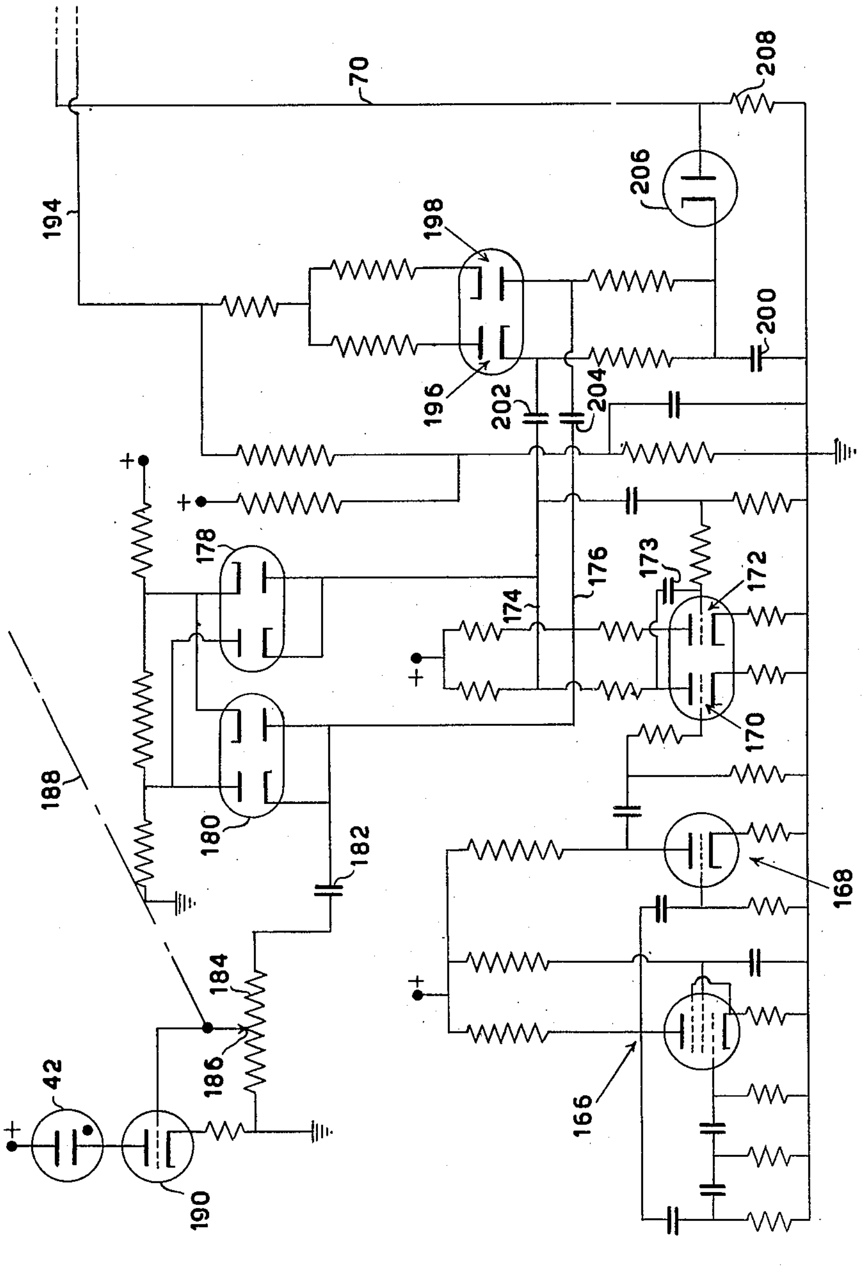
Figure 5:
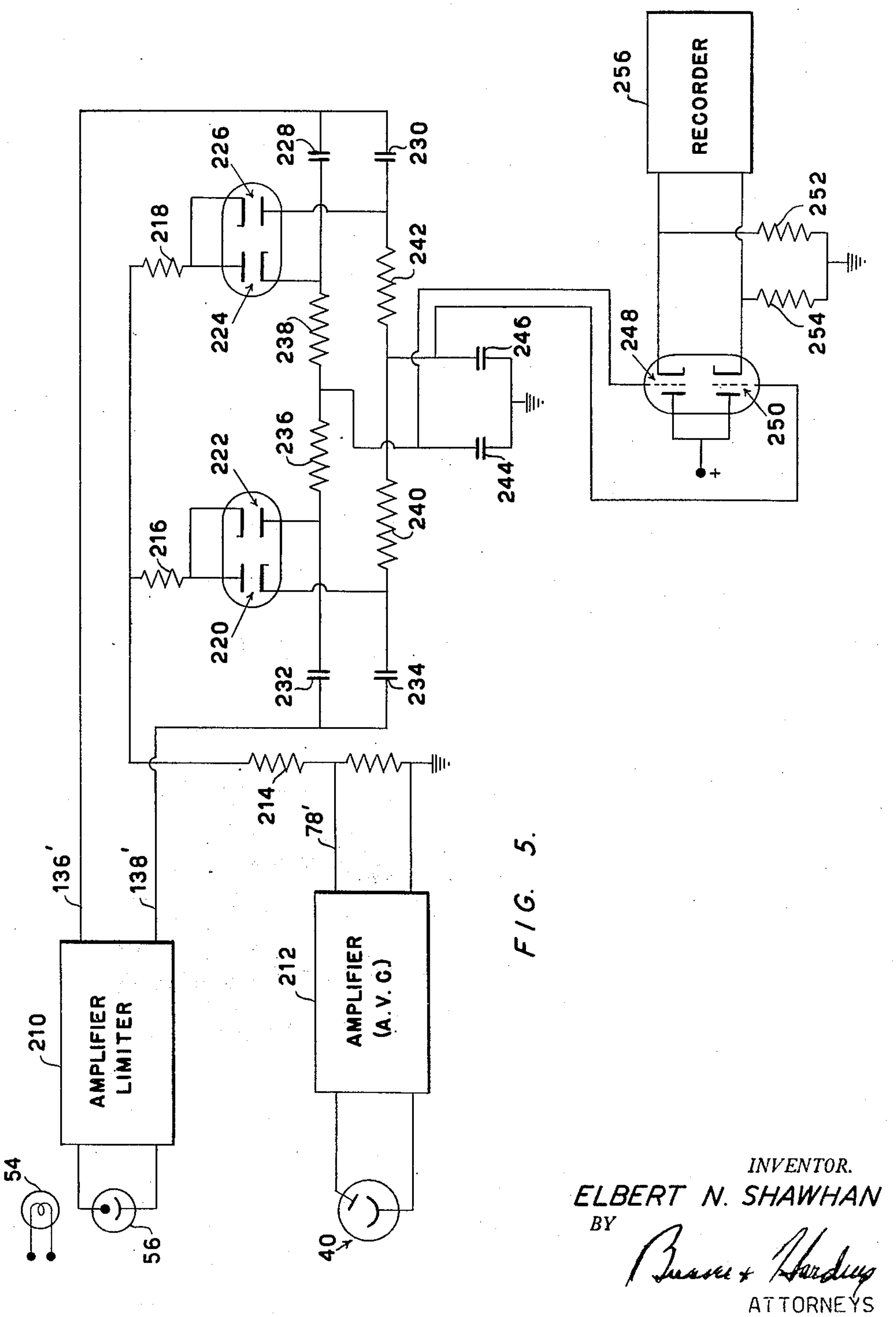
Figure 4:
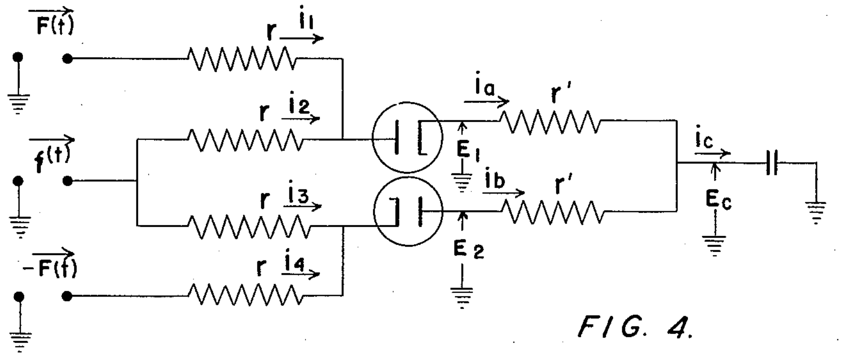
Figure 6:
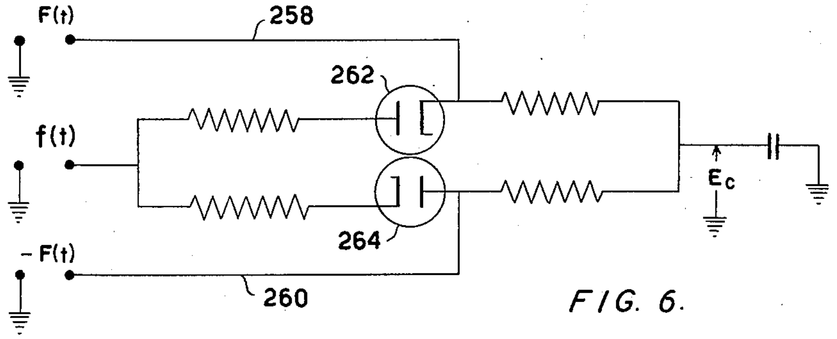

Figures 3A and 3B constitute jointly a wiring diagram showing the electrical connections of the apparatus of Figures 1 and 2;

Figure 4 is a diagram serving to illustrate the principles of operation of the synchronous rectifying or lock-in systems;

Figure 5 is a wiring diagram illustrative of a modification involving a further use of a synchronous rectifying system;

Figure 6 is a wiring diagram illustrating an alternative form which may be taken by the synchronous rectifying devices; and Figures 7, 8, 9, 10 and 11 are further wiring diagrams illustrating other forms which may be taken by the synchronous rectifying devices.

Referring first to Figures 1, 2, 3A and 3B there is illustrated therein a recording Raman spectrograph disclosed in the application mentioned above which will serve to illustrate one fashion in which synchronous rectifying devices may be used in conjunction with other apparatus for the purpose of discriminating weak signals against a background and also for the purpose of discriminating between two signals of the same frequency having different phases, and for discriminating between signals of one frequency and signals of a frequency differing very slightly from the first.

The spectrograph proper is indicated generally at 2 and this to a major extent is similar to spectrographs designed for the photographic recording of Raman spectra. The sample, the Raman spectra of which is to be measured, is contained in a vertical tube indicated at 4 surrounded by high intensity arcs 6 which serve for its excitation to cause it to emit the spectra characteristic of its composition. A condensing lens 8 concentrates the illumination on a slit 10 which acts as a line source for the spectrograph. The illumination from the slit 10 is rendered parallel by a lens 12 and is directed thereby through the dispersing prisms 14 and 18, a mirror 16 serving to turn the illumination from the first set of prisms to the second. The prisms and mirror are supported on a rotatable take indicated at 20. In any one position of this table the lens 22 projects a spectrum on a surface of which the slit 24 may be regarded as a line element. As the table 20 is rotated the spectrum image is moved relatively to the slit with the result that at any one time radiation of only a particular wave length emerges through the slit. The table 20 is driven by a synchronous motor 32 through gearing 28 and 30 associated with a micrometer sleeve 26 carrying graduations 34 readable in conjunction with fixed graduations 36. A recorder referred to hereafter may be driven directly mechanically from this table drive or may be driven electrically from a similar synchronous motor so that a curve of intensity versus wave length may be ultimately recorded. The micrometer arrangement illustrated is for the purpose of adjustment or for determination of the particular frequency emitted through the slit. It will, of course, be evident that through the micrometer arrangement the table may be rotated manually to bring any desired wave length at the slit so that its intensity may be read on a suitable meter which is either separate from or a part of an automatic recorder. Thus the apparatus may function as either a spectrograph or a spectrometer.

A lens 38 concentrates the rays emerging from the slit 24 upon the cathode of a photocell 40 which is of the multiplier type more fully illustrated in Figure 3A. A glowtube 42 is associated with a bent rod 44 of Lucite or the equivalent to transmit illumination to the phototube cathode through the lens 38. The latter arrangement is part of the automatic volume control system to be described in greater detail hereafter.

The multiplier phototube is desirably cooled, for example by the use of solid carbon dioxide, to reduce noise due to random thermionic electron emission.

A rotary table 46 carries a pair of prisms 48 subtending quadrants of the table and arranged as indicated in Figures 1 and 2. The rotation of the table causes these prisms to interrupt the illumination passing to the slit 24 so that during first and third quarters of a revolution of the table the illumination reaching the slit 24 is uninterrupted by the prisms whereas in the second and fourth quarters of the rotation of the table the illumination passes through the prisms. The result of this is that during the first and third quarters of revolution the slit receives, to the accuracy of its width, monochromatic illumination. On the other hand, through the second and fourth quarters of the revolution the spectrum is laterally displaced so that a band is scanned extending on both sides of the narrow monochromatic band which, during the first and third quarters of revolution, passes through the slit. This shift is occasioned by the refraction due to the prisms which, however, is not accompanied by additional dispersion, causing a maximum displacement of the spectrum in one direction at the beginnings of these quarters of revolution, with the displacement becoming zero in the middles of the quarters and the involving displacement in the opposite direction which displacement becomes maximum again at the ends of the quarters. As will become apparent hereafter it is not material that the sweep is nonlinear. It will suffice at this point to remark that due to the prisms there is obtained an average intensity in the vicinity of the particular monochromatic intensity momentarily under observation, so that the level of intensity of the monochromatic illumination may be compared with this average intensity for more accurate interpretation of results since it is difficult to maintain constant the intensity of excitation of the sample and the level of the continuum varies due to other causes as well, for example suspended material in the sample. When the illumination reaches the slit through the prisms it is thrown slightly out of focus on the slit but since a band is then being scanned this is immaterial.

As will be more clearly apparent from Figure 2 the table 46 is rotated by a motor 49 which may drive it at any suitable speed, for example at 1800 R. P. M., though the speed is subject to wide variation. Desirably it is sufficiently high to permit easy amplification without undue complication of an amplifier system. The table 46 is provided with a depending flange 50 in which are provided windows 52 each extending through 90°. A lamp 54 is located inside the flange and is arranged to illuminate a photocell 56 outside the flange during the passage of the windows 52. There is thus provided a light-chopping operation of the prisms 48, the chopping action of which amounts to segregation of the monochromatic illumination as compared with the illumination resulting from the sweeping actions of the prisms.

The foregoing describes the physical arrangements of various elements of the spectrometer, the electrical connections of which may now be described with reference to Figures 3A and 3B.

The multiplier phototube 40, having its anodes, cathodes and dynodes conventionally connected, delivers its output to a first amplifier tube 58 which is directly associated with the phototube, preferably in the same physical assembly. The output of the amplifier 58 is connected to a conventional alternating current amplifier comprising the pentodes 60, 62 and 64 in conventional circuits. This amplifier is designed in accordance with usual practice for the effective amplification of a wide band of frequencies, including, and greater than, the frequency of the light-chopping action occasioned by the rotation of the table 46. A potentiometer 66 between the first and second stages of this amplifier has a manually adjustable contact 68 for gain control. Automatic volume control is applied to the three amplification stages from a connection 70, hereafter referred to, through resistors 72, 74 and 76.

The amplified output delivered through the anode connection 78 from the last amplifier stage is applied through the condensers 80 and 82 to the grids of a pair of triodes 84 and 86 having cathode resistors 90 and 92. A potentiometer 88 provides for centering of the recorder response by providing relative adjustment of the potentials of the two grids. Outputs are taken from the triodes 84 nad 86 through connections 94 and 96. It may be here noted that the two triodes 84 and 86 are operating in parallel so that the signals delivered through 94 and 96 are essentially the same. These triodes, aside from providing for centering of the signal record, provide an impedance transformation from the relatively high impedance of the amplifier output stage to the low impedance required for the lock-in synchronous rectifying system which follows.

The lock-in synchronous rectifying system comprises the diodes 106, 108, 110 and 112 which are preferably of the thermionic type as illustrated. Instead of these there may be used crystal rectifiers, for example of the germanium type, which, however, are not quite as satisfactory because of leakage upon the application of inverse potentials. While useable, their performance in conjunction with practical lock-in voltage sources is inferior to that which can be obtained with thermionic type rectifiers. The connection 94 is joined to the anode of diode 106 through resistance 98 and to the cathode of anode 108 through the resistance 100. The connection 96 is joined to the anode of diode 110 through resistance 102 and to the cathode of diode 112 through the resistance 104. The resistances 98, 100, 102 and 104 are desirably equal as are the four diodes and their other corresponding connections so that a completely symmetrical unit is provided. While not absolutely essential, symmetry is desirable in order to minimize the effects of fluctuations in the lock-in voltage.

Leaving the lock-in circuit for the moment, reference may be directed to the lamp 54, which is continuously illuminated, and the photocell 56, the light between which is occulted periodically during the rotation of the table 46. A wave of illumination of square type is thus applied to the photocell 56. Amplification of the photocell output is provided by the tubes 114 and 116 and a push-pull output is provided by the conventional phase-splitting arrangement of the triodes 120 and 122, the grid of the former being supplied with signals through the condenser 118, and the grid of the latter being connected to the anode of the former through condenser 123. Resistance 124 and 126 are provided to secure a symmetrical push-pull output. This output is delivered through the connections 132 and 134 and thence to the connections 136 and 138. Dual diodes 128 and 130 connected to a potential dropping resistance arrangement 131 provide a limiter action of conventional type designed to limit the rectangular wave outputs through the lines 136 and 138.

The connection 136 delivers the rectangular limited wave through the condenser 140 and an associated series resistor to the anode of diode 106 and through the condenser 142 and an associated series resistor to the cathode of the diode 112. Connection 138 delivers the rectangular wave through the condenser 144 and an associated series resistor to the cathode of the diode 108 and through a condenser 146 and a series resistor to the anode of the diode 110.

The cathode of diode 106 and the anode of diode 108 are connected through equal resistors 107 and 109 to a connection 141 joined through a resistor 148 to one side of a bypass condenser 151. The cathode of diode 110 and the anode of diode 112 are similarly connected through equal resistors 111 and 113 to the line 143 which, through resistor 150, is connected to the opposite side of the condenser 151.

The respective lines 141 and 143 are connected to the condensers 152 and 154, the opposite sides of which are grounded. Triodes 156 and 158 have their grids respectively connected to the opposite sides of condenser 151. These triodes are provided with cathode resistors 160 and 162 to ground, and to the cathodes are connected leads extending in conventional fashion to a recorder 164 which may be of any suitable conventional type designed, for example, to draw an inked line on a chart driven in synchronism, through a mechanical connection or through a synchronous motor, with the motor 32 so that the abscissae of the chart will bear a known relationship to the position of the table 20. As will become apparent hereafter the ordinates recorded on the chart of the recorder 164 will be measures of the intensity of various points of the spectrum relative to the average intensity of a band of the spectrum extending on both sides of each particular point. The final charted result will then be a curve giving the aforementioned intensity plotted against a measure of wave length. The current fed to the recorder may, obviously, be used for automatic control.

A phase shift oscillator 166 of conventional type (Figure 3B) furnishes an output having a frequency which desirably differs by only a few cycles per second from the frequency of chopping occasioned by rotation of the table 46. The output of this oscillator is amplified by a tube 168 which feeds a phase-splitting circuit comprising triodes 170 and 172 and condenser 173, the push-pull output of which circuit is delivered through the connections 174 and 176. A limiter system provided by a pair of dual diodes 178 and 180, having connections similar to those described in connection with the dual diodes 128 and 130, supplies a rectangular wave of substantially constant amplitude through the condenser 182 to the potentiometer resistance 184, the movable contact 186 of which is connected as indicated at 188 mechanically to the contact 68 so as to be manually adjustable therewith. This arrangement is such that as the amplifier gain is increased the rectangular wave potential applied at 186 is decreased. A triode 190 has its grid connected to the contact 186 and in the anode circuit of this triode there is provided the glow-tube 42 previously described.

As was indicated in connection with Figure 1 the glow-tube 42 provides illumination to the multiplier phototube so that the light given out by it gives rise to corresponding signals through the amplifier system of the multiplier phototube. These signals are taken from the amplifier output through the condenser 192 and line 194 and are delivered to the synchronous rectifier system comprising the diodes 196 and 198 and their connections. Signals from the lines 174 and 176 are provided to the cathode of diode 196 and the anode of diode 198 through condensers 202 and 204. The last named cathode and the last named anode are connected through equal resistors to the ungrounded side of a condenser 200, which side of the condenser is also connected to the cathode of a diode 206, the anode of which is connected to ground through the resistor 208 and is also connected to the line 70 which controls the gain of the amplifier stages as indicated above.

Despite the fact that the frequency of the signals originating in the spectrograph and in the flow-tube 42 respectively are quite close to each other, the synchronous rectifying systems, the actions of which will be more fully discussed hereafter, provide very complete suppression of the frequencies with which they are not synchronized with the result that the signals originating in the glow-tube 42 are completely prevented from giving any response at the recorder while consversely the signals originating in the spectrograph are prevented from giving rise to any automatic volume control potential. On the other hand, the system extending from the cathode of the multiplier phototube through the complete amplifier system to its output 70 is subjected to both signals and since they differ by only a few cycles per second the response to one will be at all times substantially identical with the response to the other. The automatic volume control system maintains constant the output from the amplifier which, in turn, is dependent upon a constant input from the glow-tube. The complete phototube-amplifier system is thus caused to have a fixed gain irrespective of variations in sensitivity of the phototube and gain of the amplifier. The resulting output from signals of the spectrograph is thus rendered independent of these last factors.

The operation of the synchronous rectifying or lock-in system may be described in connection with Figure 4 which will be recognized as corresponding to one of the synchronous rectifying elements in Figure 3A, for example that corresponding to the diodes 106 and 108 and their connections. In Figure 4 there is indicated the charging of a single condenser C such as 152 in Figure 3A. The system of Figure 3A merely consists of an elaboration of Figure 4 by virtue of its duplication to charge two condensers and to secure an output potential equivalent to the difference between the condenser potentials. The following discussion applied to Figure 4 on which are indicated various potentials, currents and resistance values will make clear the operation of the synchronous rectifier.

Assuming that a current $i_a$ flows through the upper diode, $$E_1=F(t)-ri_1$$

$$E_1=f(t)-ri_2$$

Since $i_a=i_1+i_2$ and $E_1-E_c=r'i_a$, $$i_a(2r'+r)=F(t)+f(t)-2E_c$$

Evidently if $|F(t)|$ is always greater than $|f(t)|+2|E_c|$ current $i_a$ will flow throughout a positive half cycle of $F(t)$, and no current $i_a$ will flow at any time during a negative half cycle.

Similarly, assuming that a current $i_b$ flows through the lower dode, $$i_b(2r'+r)=-F(t)+f(t)-2E_c$$

The condition stated for $F(t)$ will insure that current $i_b$ will flow throughout a positive half cycle of $F(t)$ and that no current $i_b$ will flow at any time during a negative half cycle.

In any positive half cycle of $F(t)$ the instantaneous charging current $i_c$ for the condenser will be given by $$i_c(2r'+r)=2f(t)-4E_c$$

Assuming a large time constant, i. e., the resistances in the circuit to be large and the capacity C of the condenser large, so that during any cycle $E_c$ may be regarded as substantially constant, integration over a positive half cycle of $F(t)$ gives:

$$\frac{(2r'+r)}{T}\int_0^{\frac{T}{2}} i_c \cdot dt=\frac{2}{T}\int_0^{\frac{T}{2}} f(t)\cdot dt-2E_c$$

the first term on the right is the average value of $f(t)$ for this half cycle while the term on the left is proportional to the average value of $i_c$ for the same half cycle. It will be evident that the average charging current will become zero when $E_c$ is equal to one half the average value of $f(t)$ during the positive half cycle. Furthermore, it will be evident that whenever this equality does not exist, the charging current has a direction to approach this equality. The values of $f(t)$ during the negative half cycle of $F(t)$ have no effect on $E_c$.

The synchronous rectifying action of the circuit will now be evident. If $f(t)$ has the same frequency as $F(t)$, or an odd harmonic of that frequency, it will be clear that pulses of charging current during successive positive half cycles of the latter will charge (algebraically speaking) the condenser so that its potential will measure the average value of $f(t)$ in those half cycles, approaching a constant value as the number of half cycles increases. On the other hand for any other frequency of $f(t)$, the charging pulses will average out to give an average zero charging current. The alternating ripple having a frequency equal to the difference between the signal and synchronizing frequency will be filtered out by reason of the large time constant of the circuit comprising the high resistances and the large condenser. Hence quite critical frequency selection is afforded. Using suitably large time constants, a frequency differing from the lock-in frequency even by only a fraction of a cycle per second may be discriminated.

The attainment of phase discrimination will also be evident from the foregoing analysis. As stated, the integral on the right hand side of the last equation given above is the average value of $f(t)$ during the positive half cycle of $F(t)$. If, therefore, $f(t)$ is a sine wave which has the frequency of, and is in phase with, $F(t)$, the condenser will charge to a potential equal to one half the average value of $f(t)$ during the positive half cycle of $F(t)$, i. e., the average value of a positive half cycle of $f(t)$. On the other hand if the phase of $f(t)$ is shifted 90° with respect to $F(t)$, the integral under discussion is zero, and the condenser potential will be zero. A further shift to a 180° phase relationship will result in a change of the condenser to a potential equal to one half the average value of a negative half cycle of $f(t)$, while a 270° phase relationship will again result in a zero potential of the condenser. Thus two signals of the same frequency as the lock-in potential may be completely segregated if 90° out of phase with each other. Intermediate phase conditions will, of course, give rise to output potentials which have values corresponding to the conditions in accordance with the equation given above with the average value of $i_c$ equated to zero.

In the above discussion there is involved simplification by assumptions of conditions which need not be satisfied for practical acceptable operation. Instead of diodes other rectifiers may be used which, despite inverse leakage of current, will nevertheless give rise to outputs which are functions of the signal and which involve sharp frequency discrimination. Strict equality of the resistances is also not required. It may also be noted that, while for simplicity all four input resistances were assumed equal, it is only necessary for optimum results that the first and fourth should be nearly the same and that the second and third should be nearly the same. A somewhat more elaborate analysis will reveal this to be true. The resistors in series with the diodes have resistances much greater than the forward diode resistances; for this reason the forward diode resistances were omitted from the foregoing analysis.

The present lock-in circuit together with its variations which will be later referred to has the following advantages:

Transformers are desirably avoided, so that there will be no phase shift with amplitude; however, they may be used where lower sensitivities are required.

The effect of variations in the lock-in signal is minimized when a rectangular wave form such as described is used since there is then no question of ample lock-in voltage even at the time of switching; but all that is required is that the lock-in voltage should exceed the signal voltage to a proper degree to perform its switching operation which latter is its sole function. A rectangular wave form is also desirable since the transfer interval is thus made negligibly small and noise is not transmitted during the switching interval. Other lock-in wave forms may be used although they are less practical; for example, a sine wave may be used if of sufficient amplitude. The shape of positive half cycles should be substantially identical with that of negative half cycles.

The matching of the diodes is not necessary for optimum operation. After switching occurs the forward resistances of the diodes are small compared with the resistances in series with them.

The time constant for averaging positive and negative pulses are accurately the same, as required for rejection of high level noise. A slight asymmetry will permit rectification of noise which will give rise to a noise component in the output.

An off-frequency voltage makes negligible contribution to the direct output.

As indicated previously, Figure 3A involves a duplication of the system of Figure 4 for the purpose of securing a differential output. Essentially two of these systems are provided involving integration during different half cycles of the lock-in voltage, charging two condensers, the potentials of which are supplied to the grids of the triodes 156 and 158 to give a differential output to the recorder. The object of this is to compare the monochromatic response with the band response to take care of varying excitation of the sample by the arcs.

A synchronous rectifying system of the type described effects very substantial suppression of noise. For example, in the system of Figures 3A and 3B, with an integrating time constant of two seconds electronic noise of the order of $2\times10^{-15}$ ampere at the multiplier phototube cathode causes the same contribution at the output as would be caused by $2\times10^{-18}$ ampere without the filtering action. Noise is thus reduced by a factor of about 1000.

The frequency discriminating action may be illustrated by a typical example in which a 30 volt input signal to the system of Figure 4, which signal had a frequency differing by 5 cycles per second from the lock-in frequency, gave rise to a change of potential of the condenser of less than 0.01 volt.

The chief limitation on operation from the standpoint of measurement is the discontinuous nature of the photoelectric current at very low levels of illumination.

As will be clear from the mathematical discussion above, odd harmonics of the signal would give a contribution to the output. However, in most cases these need not be considered because they arise also as contributions from the signals to be measured as contrasted with noise or off-frequency signals which are to be eliminated. If desired, the amplifying system may be arranged to suppress the odd harmonics by provision of filters in conventional fashion.

Figure 6 illustrates for direct comparison with Figure 4 an alternative synchronous rectifying circuit in which the lock-in voltage is applied through the lines 258 and 260 to the output sides rather than the input sides of the diodes 262 and 264. The action is very similar to that involved in the arrangement of Figure 4 and need not be described in detail. Preferably, the resistances on the signal input sides of the diodes should be large in comparison with those on the signal output sides. It will be noted that this arrangement is used in Figure 3B in connection with the diodes 196 and 198 to give the automatic volume control voltage. The synchronous rectification provided in Figure 3B will, as now evident, suppress both noise and the spectral signals and will give a selective response to the signals originating in the glow-tube 42 to provide automatic volume control.

Figures 7, 8:
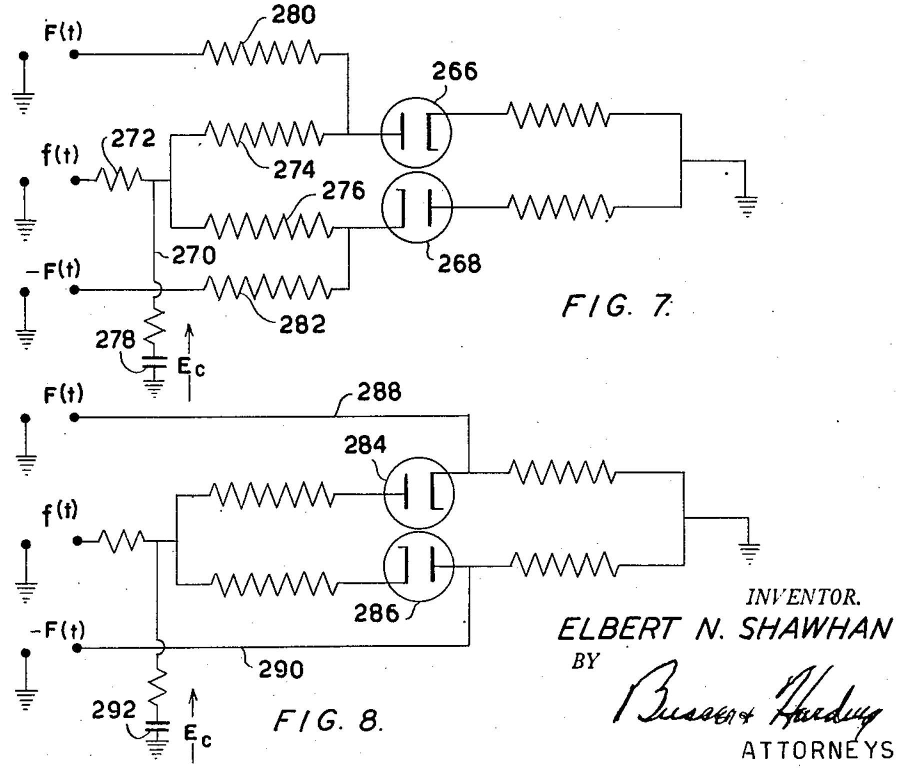

Figures 7 and 8 are further synchronous rectifying circuits respectively resembling those of Figures 4 and 6 but illustrating the take-off of signals on the input rather than the output sides of the diodes. In Figure 7, the diodes 266 and 268 are fed the signal current through the resistance 272 and the parallel arrangement of resistances 274 and 276. The lock-in voltage is applied through the resistances 280 and 282. A direct potential is built up across the condenser 278 through the connection 270 in much the same fashion as in the case of Figure 4 described in detail above. Figure 8 differs from Figure 7 and may be compared with Figure 6 in that the lock-in voltage is applied to the far sides of the diodes 284 and 286 with respect to the signal and the slowly varying output potential will appear across the condenser 292, the connections of which are similar to those of Figure 7.

Figure 9:
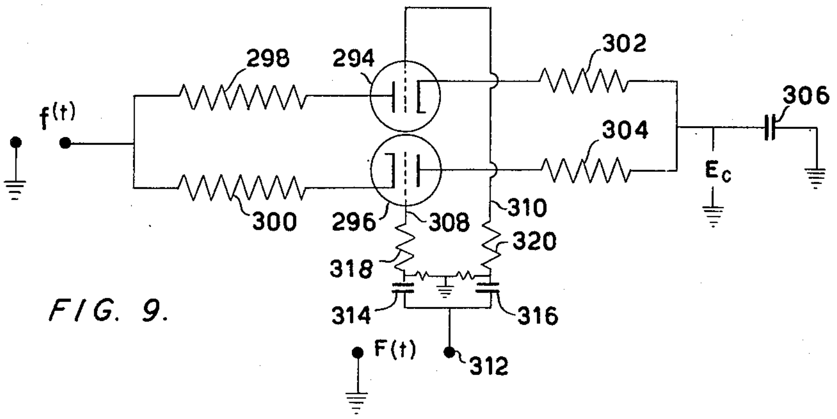

In the various synchronous rectifying circuits so far described, diodes have been used. It will be evident that triodes or other multiple element tubes may be used in numerous circuits for the same purpose. Figure 9, which may be compared with Figures 4 and 6, illustrates the use of triodes 294 and 296 in place of the diodes. The signal is applied to the anode and cathode of these respective tubes through resistances 298 and 300 and the respective cathode and anode are connected through resistances 302 and 304, respectively, to the output condenser 306. In this case, the lock-in voltage is applied from the terminal 312 through the condensers 314 and 316, resistances 318 and 320 and connections 308 and 310 to the grids of the triodes. Analysis will readily reveal the equivalence of operation of this circuit to the operation of the circuits previously mentioned. It will, of course, here be obvious that the output may be taken from the signal input portion of the circuit in the fashion generally indicated in Figures 7 and 8.

Figure 10:
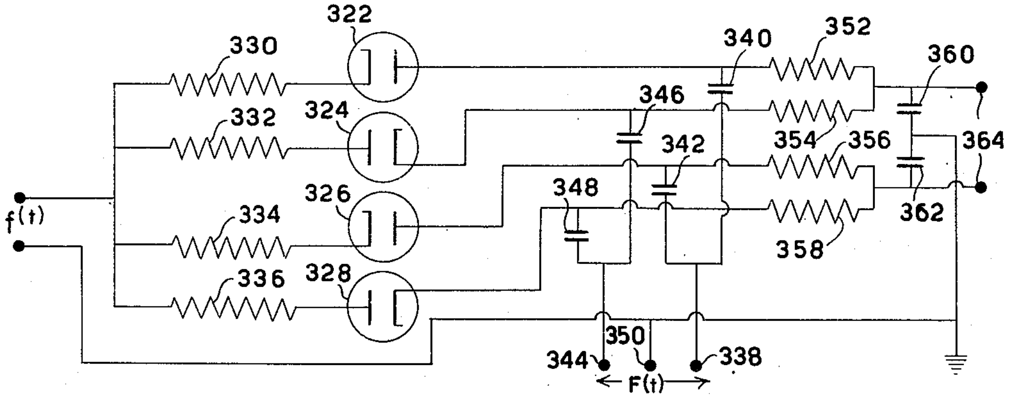

Figure 10 illustrates a circuit which is quite similar to that indicated at the right-hand side of Figure 3A with the exception that the lock-in voltage is applied at the output sides of the diodes. Diodes 322, 324, 326, and 328 are here used with series input resistors 330, 332, 334 and 336. To the output leads of these diodes the center tapped lock-in voltage is applied from the terminal 338 through the condensers 340 and 342 and from the terminal 344 through the condensers 346 and 348. The center tap 350 is grounded. The output is delivered through the resistors 352, 354, 356 and 358 to the series arrangement of condensers 350 and 362, the output being delivered from the terminals 364. From considerations previously described, it will be evident that this circuit functions in the same fashion as the other circuits.

Figure 11:
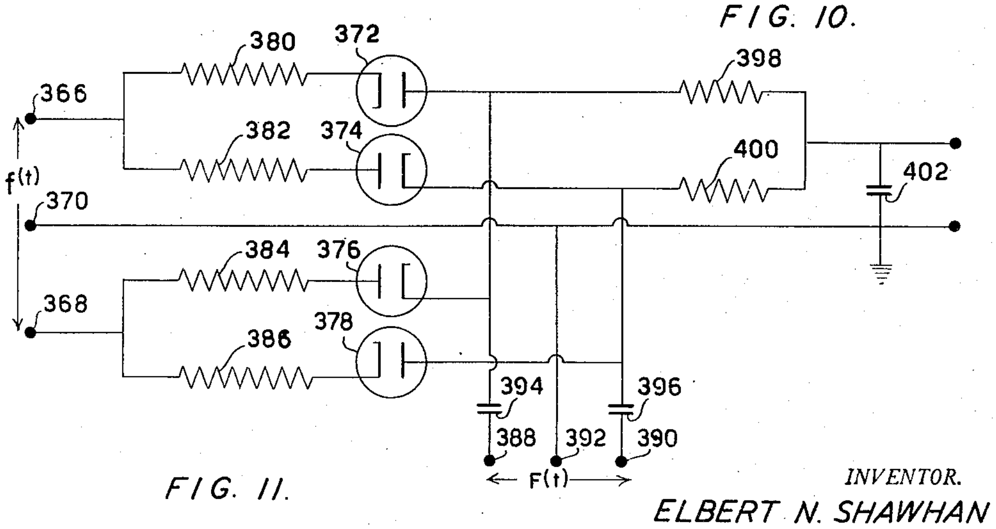

Figure 11 illustrates still another circuit in which center taps of both the signal voltage and lock-in voltage are grounded. The signal input terminals are 366 and 368 and the center grounded terminal 370. Input is through the resistances 380, 382, 384 and 386 to the respective diodes 372, 374, 376 and 378. The cathode of diode 374 and anode of diode 378 are connected through condenser 396 to the lock-in voltage input terminal 390. The anode of diode 372 and cathode of diode 376 are connected through condenser 394 to the other terminal 388 of the lock-in voltage. The central terminal 392 of this is grounded. The output is delivered through resistors 398 and 400 to the condenser 402, one side of which is grounded.

In all of the various circuits, of course, crystal or other rectifiers may be used, though, as pointed out previously, they offer some disadvantages because of inverse leakage. Electronic tubes are accordingly to be preferred. It will be evident that, where the potentials are sufficiently high, gas filled tubes may also be used.

It may be pointed out that, in general, these circuits are bidirectional so that the application of signal and lock-in voltages may be interchanged as well as the input and output terminals, when the relationships to ground are suitable. Thus there may be readily developed a different variety of equivalently operating circuits based upon the fundamental aspects of this phase of the invention.

The use of the scanning prisms 48 results in the production of a record in which illumination corresponding to the lines is recorded as well as illumination corresponding to the regions in the vicinity of the lines. Background illumination, however, is eliminated by the use of a differential system. These matters peculiar to the spectrograph system need not be described herein in detail but will be found in the application referred to above.

It will, of course, be obvious that the scanning system involving the prisms 48 may be omitted and that the chopping action may then be effected merely by a slotted disc, or the equivalent, chopping both the spectral illumination and the light passing between a lamp such as 54 and an associated photocell such as 56. In such case the spectral lines will be recorded but due account must then be taken of the changes in background level which will not appear on the record. The lock-in circuit of Figure 3A will stabilize such a system against changes in line voltage fluctuations. The driver stage, consisting of tubes 84 and 86, and the recorder stage, consisting of tubes 156 and 158, are made largely independent of line fluctuations by the use of the lock-in circuit in which the inputs are in phase and the outputs are push-pull or double-ended. Although the currents through these tubes will change with line voltage, the outputs will not change since these are of a differential nature.

In the use of a slotted disc as just mentioned, if it is analogous to the chopping action of the devices specifically referred to above, the slots therein would be evenly spaced and of uniform width, resulting in signal and lock-in voltages of substantially constant frequency. However, there is no necessity for utilizing a constant frequency and, in fact, there are instances where this constant frequency would be undesirable. Frequency modulation may be imparted to both a signal to be measured and the lock-in signal by providing a rotating disc with unevenly spaced slots which, in fact, need not follow any continuous pattern of variation throughout the circumference. In other words, in this fashion, by uneven spacing of slots and by unequal widths, there may be chosen a quite arbitrary repeated series of signal and lock-in waves having both variable frequency and phase. The result in such case is to secure discrimination against any signal frequencies which might correspond to the frequency of rotation of the disc or any of its harmonics. Such an arrangement will be useful, for example, where it is desired to discriminate against spurious frequencies which may be of uncontrollable frequency and might possibly correspond to some such frequencies related to a disc rotation as just mentioned. That such discrimination will occur will be evident from the mathematical discussion heretofore presented which shows that over a suitable interval the output of a synchronous rectifying system is determined solely by what occurs during the fractional periods of rectangular waves of the lock-in voltage.

Figure 5 illustrates a system which may be used as an alternative to that of Figures 3A and 3B, which system will suggest still other alternatives in line with the principles of the invention. In Figure 5 lamp 54 and photocell 56 and multiplier photocell 40 are designated as in Figures 3A and 3B and may be similarly physically arranged. In addition, not illustrated in Figure 5, there would be involved the automatic volume control system of Figures 3A and 3B for control of the amplifier 212 corresponding to the multiplier photocell amplifier of Figure 3A. At 210 there is indicated the amplifier-limiter system associated with the photocell 56 in Figure 3A with output lines 136′ and 138′ corresponding respectively to 136 and 138 of Figure 3A. The line 78′ from the amplifier 212 corresponds to the line 78 from the amplifier in Figure 3A. Reference to the earlier described modification will accordingly illustrate all of the parts to the left of these lines.

Signals from the line 78′ are applied through resistances 214, 216 and 218 to the anodes of diodes 220 and 224 and to the cathodes of diodes 222 and 226. Condensers 228 and 230 respectively deliver lock-in signals from the line 136′ to the cathode of diode 224 and to the anode of diode 226. Condensers 232 and 234 respectively deliver lock-in signals from the line 138′ to the anode of diode 222 and to the cathode of diode 220. The anode of 222 and the cathode of 224 are joined by resistances 236 and 238 while the cathode of 220 and the anode of 226 are joined by resistances 240 and 242. Connections from the junctions of the resistances of these pairs are arranged for the respective charging of condensers 244 and 246 which are connected to the grids of triodes 248 and 250 across the cathode resistors 252 and 254 of which the recorder 256 is connected. It will be evident that the current through the recorder connections could be used for automatic control.

It will be noted that the lock-in switching system of Figure 5 corresponds to a duplication of that which is illustrated in Figure 6. From previous discussions the operation of Figure 5 will be readily understood and will be noted to be essentially similar to that of the modification of Figures 3A and 3B.

The spectrometer which has been described will be recognized as merely illustrative of the more general applicability of the synchronous lock-in rectifier systems which have been mentioned and serves to illustrate typical devices associated therewith to supply signal and lock-in inputs and suitable outputs which may be used for measuring or control purposes. It will be clear that numerous variations may be readily made in the various parts of the apparatus disclosed. The chopping of the signals may be effected by electrical or mechanical commutation but preferably is accomplished by the chopping of light beams in the fashions illustrated and described where such light beams may be conveniently involved in the system since there is then involved no error due to contact potentials or to unavoidable variations in electrical potentials or currents. Another method of commutation which may be mentioned is that effected by the electrical or magnetic deflection of electronic or ionic beams as, for example, by the magnetic deflection of an ionic beam in a mass spectrometer. Under such conditions the provision of rectangular lock-in waves may be secured by suitable electronic generators of rectangular waves synchronized with the electrical or magnetic devices arranged to deflect the beams. In all of these cases the modulation or commutation may be subject to frequency or phase variations which, as indicated above, will provide discrimination not only against noise and particular frequencies but against all continuous frequency signals.

Amplification, limiting, recorder output and matching circuits are, of course, subject to wide variations in accordance with conventional practices in the electronic arts.

It will be evident from the foregoing that the synchronous rectification systems provided in accordance with the invention are of very general and broad applicability and essentially serve for extremely sharp discrimination of signals from signals having other characteristics including such signals as may be classified as noise. Due to the possible complete absence of mechanical parts there is no upper limitation to the frequencies which may be discriminated against spurious signals and it will be evident, therefore, that the invention is applicable to the segregation of signals in high frequency communication systems. In particular, there is possible the segregation of signals of quite closely related frequencies travelling over common channels. It will, therefore, be understood that the invention is not to be regarded as limited by the specific disclosures offered for purposes of illustration but is only limited in accordance with the appended claims.

What I claim and desire to protect by Letters Patent is:

1. A synchronous rectifier comprising first and second diodes, each having an anode and a cathode, a pair of junction points, one of which junction points is connected through a first resistance to the anode of the first diode and through a second resistance to the cathode of the second diode, and the other of which junction points is connected through a third resistance to the cathode of the first diode and through a fourth resistance to the anode of the second diode, each of the resulting parallel connections between the junction points having a total resistance of its component resistances substantially greater than the forward resistance of its included diode, means applying between the cathode of one diode and the anode of the other diode an alternating switching potential to control periodically the simultaneous conductivity of said diodes, means applying a signal to the aforementioned circuit to flow through both diodes simultaneously while said diodes are rendered conductive by said switching potential, and a capacitance connected across spaced points in said circuit to accumulate a direct potential in measurement of said signal.

2. A synchronous rectifier comprising first and second diodes, each having an anode and a cathode, a pair of junction points, one of which junction points is connected through a first resistance to the anode of the first diode and through a second resistance to the cathode of the second diode, and the other of which junction points is connected through a third resistance to the cathode of the first diode and through a fourth resistance to the anode of the second diode, each of the resulting parallel connections between the junction points having a total resistance of its component resistances substantially greater than the forward resistance of its included diode, means applying between the cathode of one diode and the anode of the other diode an alternating substantially square wave switching potential to control periodically the simultaneous conductivity of said diodes, means applying a signal to the aforementioned circuit to flow through both diodes simultaneously while said diodes are rendered conductive by said switching potential, and a capacitance connected across spaced points in said circuit to accumulate a direct potential in measurement of said signal.

3. A synchronous rectifier comprising first and second diodes, each having an anode and a cathode, a pair of junction points, one of which junction points is connected through a first resistance to the anode of the first diode and through a second resistance, substantially equal to the first resistance, to the cathode of the second diode, and the other of which junction points is connected through a third resistance to the cathode of the first diode and through a fourth resistance, substantially equal to the third resistance, to the anode of the second diode, each of the resulting parallel connections between the junction points having a total resistance of its component resistances substantially greater than the forward resistance of its included diode, means applying between the cathode of one diode and the anode of the other diode an alternating switching potential to control periodically the simultaneous conductivity of said diodes, means applying a signal to the aforementioned circuit to flow through both diodes simultaneously while said diodes are rendered conductive by said switching potential, and a capacitance connected across spaced points in said circuit to accumulate a direct potential in measurement of said signal.

ELBERT N. SHAWHAN.

REFERENCES CITED

The following references are of record in the file of this patent:

UNITED STATES PATENTS

| Number | Name | Date |
|---|---|---|
| 2,250,284 | Wendt | July 22, 1941 |
| 2,358,545 | Wendt | Sept. 19, 1944 |
| 2,377,327 | Seeley | June 5, 1945 |
| 2,389,692 | Sherwin | Nov. 27, 1945 |
| 2,445,773 | Frost | July 27, 1948 |
| 2,446,188 | Miller | Aug. 3, 1948 |
| 2,458,156 | Fredendall | Jan. 4, 1949 |
| 2,463,685 | Fredendall et al. | Mar. 8, 1949 |